July 21, 1931. J. R. GAMMETER 1,815,558
FLOOR COVERING OR MAT AND METHOD FOR MAKING THE SAME
Filed Oct. 9, 1929
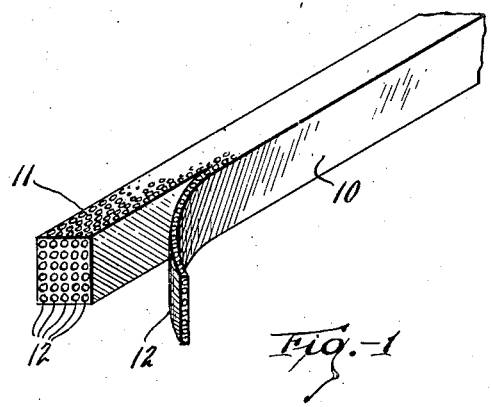
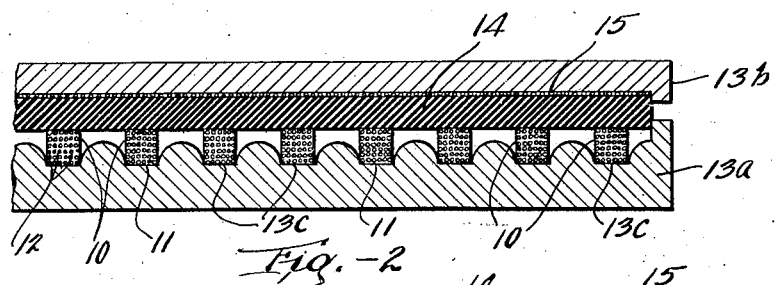
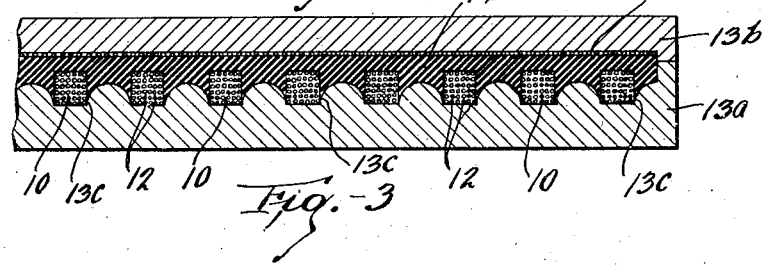
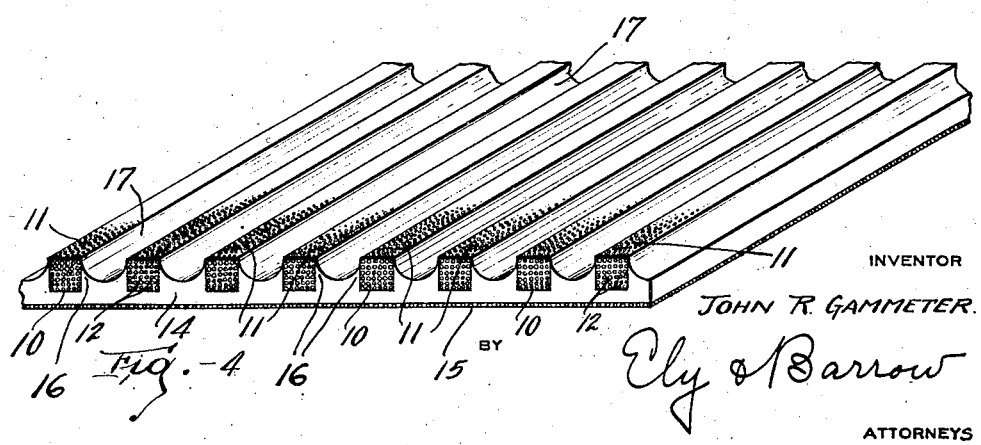
INVENTOR
JOHN R. GAMMETER.
BY Ely & Barrow
ATTORNEYS Patented July 21, 1931

1,815,558

UNITED STATES PATENT OFFICE

JOHN R. GAMMETER, OF AKRON, OHIO

FLOOR COVERING OR MAT AND METHOD FOR MAKING THE SAME

Application filed October 9, 1929. Serial No. 398,307.

This invention relates to floor coverings such as treads, mats, runners, etc. and to methods for producing the same.

The general purpose of the invention is to provide an improved floor covering or mat capable of long and effective use, and to a method for making such floor coverings.

More particularly, the invention has for its object the provision of a rubber and fabric or cord floor covering in which the fabric or cord are so incorporated in the rubber that the ends of the threads or cords are exposed on the face of the floor covering and the floor covering then vulcanized to provide an integral structure, whereby the floor covering is highly resistant to wear.

A further object of the invention is to provide such a floor covering as described above in which strips of a fabric or cord structure are incorporated in spaced relation in the rubber body of the floor covering, the strips being resistant to wear and the rubber body in which they are set providing the desired cushioning effect.

A further object of the invention is to provide a ribbed floor covering of the kind described above, in which the strips of fabric or cord structure are set to take the wear at the upper surfaces of the ribs.

A further object of the invention is to provide a method for producing the above described floor coverings.

The foregoing and other objects of the invention are attained in the floor covering or mat illustrated in the accompanying drawings and described below. It is to be understood that the invention is not limited to the particular form thereof shown and described.

Of the accompanying drawings,

Figure 1 is a perspective view of a strip of rubberized cord construction adapted for use in the improved floor covering or mat;

Figure 2 is a sectional view through an open mold showing the assembly of the various parts of the floor covering therein for vulcanization;

Figure 3 illustrates the forming of the floor covering or mat by the vulcanizing mold; and Figure 4 is a perspective view of a finished piece of the floor covering or mat embodying the invention.

Referring to the drawings, the numeral 10 designates a strip of rubberized cord construction, in which ends of the cords or threads are exposed at edges of the strips as at 11. The cord structure is to be preferred since this is not subject to ply separation under pressure edgewise of the plies. Moreover, the plies of rubberized cords are more resistant to deterioration by moisture than the fabric which cannot be as thoroughly surrounded and embedded in rubber. This strip may comprise laminations or plies 12 of rubberized cords in which the cords are arranged on the bias, the cords in adjacent plies being at opposite angles. This particular construction is desirable in that the strips will be stronger and more resistant to wear.

The strips 10 may be cut to any desired length and width from sheets of rubberized laminated cord fabric or cords previously made by any of a number of well-known methods and previously vulcanized so that the laminations of the strips are permanently bonded together before incorporation of the strips in a floor covering.

In the construction of a mat or floor covering from this material, it may be laid in spaced grooves 13$^c$, 13$^c$ in one mold member with an edge 11 down, a quantity 14 of rubber being placed thereover, together with a fabric or other backing 15 if desired, the assembled parts of the floor covering being vulcanized under heat and pressure enclosed in mold member 13$^a$ by mold member 13$^b$ in Figure 3 to produce the floor covering or mat in Figure 4. The rubber body 14 is compounded so as to provide an effective yielding or cushioning support for the strips 10. The strips 10 being pre-vulcanized, are additionally vulcanized by this step of the method so as to become comparatively hard and wear resisting. Due to prevulcanization of the strips 10 these are not distorted or flattened out of shape under the heat and pressure of the vulcanization of the mat.

The opposite bias angular arrangement of the cords in the strips 10 avoids the presence of a plane of cleavage across the strips so that there is no tendency for separation of the cords in this direction under the pressures to which they are subjected in service. Due to the longitudinal extension of the laminations of cords in the strip, however, there are well-defined longitudinal planes of cleavage between the laminations. The tendency to separate along these planes is minimized by the prevulcanization of the cords and as a further provision to prevent such separation the sides of the strips are buttressed by the rubber fillets or the like 16 which fillets are defined by the shape of the grooves 17 between the strips. These grooves are preferably rounded as shown to permit easy cleaning but so far as the buttress effect is concerned may be of any desired shape so long as lateral support is given to the sides of the strips to prevent the outer plies from being separated and squashed out over the grooves.

This resulting flooring material consists of a cushioning rubber body portion 14, with or without a flexible backing 15 and having the strips 10 permanently secured therein, these strips preferably providing ribs on the wear surface of the flooring material and the ends of the cords or threads being exposed at the surface of the material offer great resistance to wear and abrasion. The strips 10 provide effective frictional surfaces to prevent slipping, and when arranged as the ribs of a mat, provide effective scrapers for removing mud and dirt clinging to the footwear. The non-skidding surface of the mat becomes more effective upon wear since the rubber about the cords wears away in such a way as to leave the ends of the cords projecting slightly above the rubber surfaces.

It will appear from the foregoing that an improved form of mat or floor covering has been provided by the invention. Obviously, modifications of the invention may be resorted to without departing from the spirit thereof or the scope of the appended claims.

What is claimed is:

1. A covering for the surfaces of floors or the like comprising an integral vulcanized structure including a body of elastic rubber and strips of rubberized cord material partly embedded in the upper face of said body to provide ribs, said strips comprising laminations of cords bonded together by prevulcanization with rubber to provide a comparatively hard wear resistant material in which the individual cords are surrounded by rubber, the cords in adjacent layers being at opposite bias angles and ends of the cords being exposed at the upper faces of the strips.

2. That method for making coverings for the surfaces of floors or the like which comprises making strips comprising laminations of cords bonded together by prevulcanization with rubber with the cords in adjacent plies at opposite bias angles and the individual cords surrounded by rubber and with the ends of the cords exposed in faces of the strips, and embedding and vulcanizing said strips in a body of elastic rubber with said faces exposed.

3. A covering for the surfaces of floors or the like comprising an integral vulcanized structure including a body of elastic rubber and strips of rubberized cord material partly embedded in the upper face of said body to provide ribs, said strips comprising longitudinal laminations of cords bonded together with rubber in which the individual cords are surrounded by rubber and the cords in adjacent layers are at opposite bias angles, and the ends of the cords being exposed in the upper faces of the strips, the grooves in the mat between said ribs being of such shape as to define buttresses for providing lateral supports for the sides of the strips, and the grooves being rounded to facilitate cleaning.

4. A covering for the surfaces of floors or the like comprising an integral vulcanized structure including a body of elastic rubber and strips of rubberized cord material partly embedded in the upper face of said body to provide ribs, said strips comprising longitudinal laminations of cords bonded together with rubber in which the individual cords are surrounded by rubber and the cords in adjacent layers are at opposite bias angles, and the ends of the cords being exposed in the upper faces of the strips, and the grooves in the mat between said ribs being of such shape as to define buttresses for providing lateral supports for the sides of the strips.

5. A covering for the surfaces of floors or the like comprising an integral vulcanized structure including a body of elastic rubber and strips of rubberized cord material partly embedded in the upper face of said body to provide ribs, said strips comprising longitudinal laminations of cords bonded together by prevulcanization with rubber in which the individual cords are surrounded by rubber and the cords in adjacent layers are at opposite bias angles, the ends of the cords being exposed in the upper faces of the strips, and the grooves in the mat between said ribs being of such shape as to define buttresses for providing lateral supports for the sides of the strips.

JOHN R. GAMMETER.